UNITED STATES PATENT OFFICE.

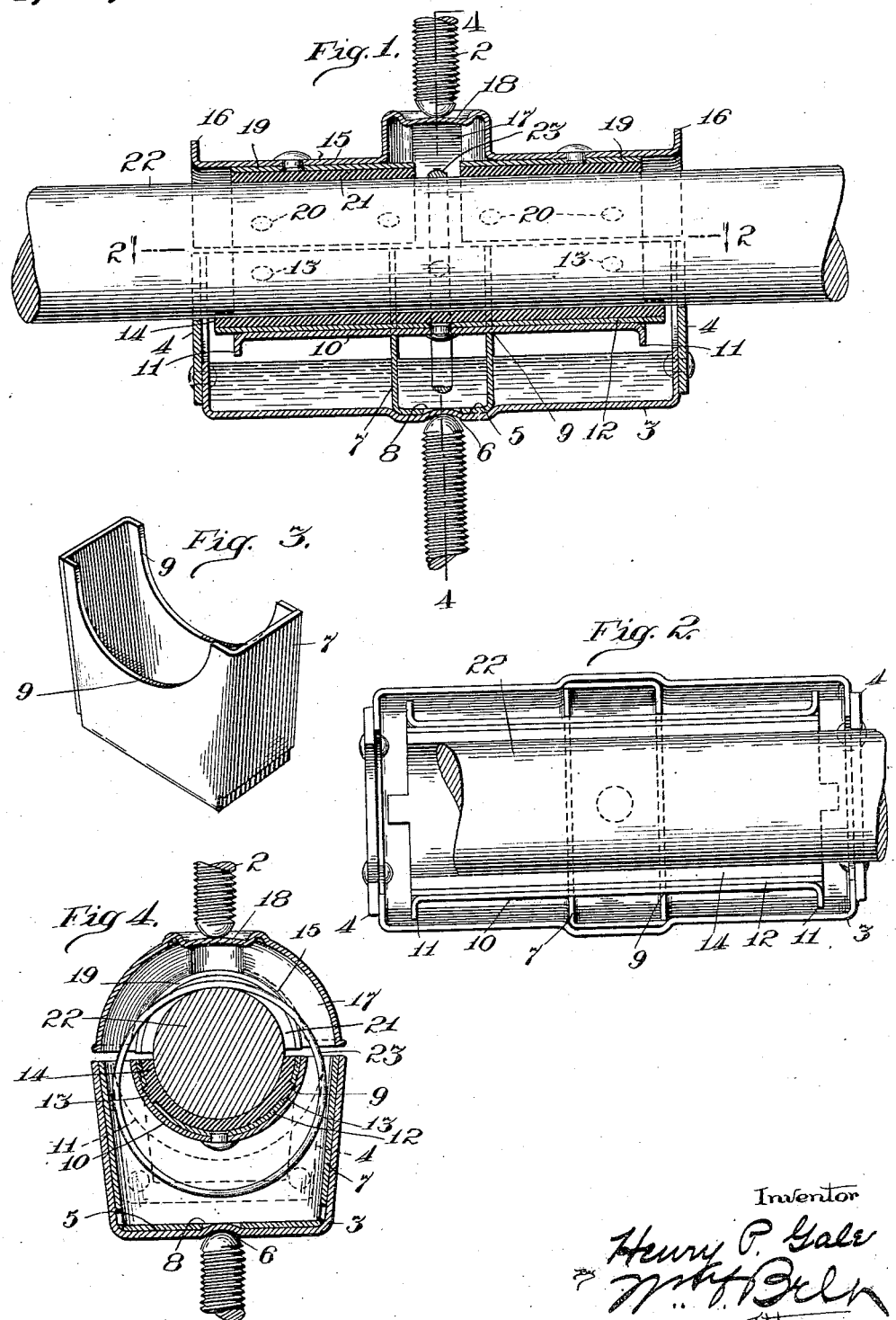

HENRY P. GALE, OF ONEIDA, NEW YORK.

SHAFT-HANGER BOX.

1,261,918.   Specification of Letters Patent.   Patented Apr. 9, 1918.

Application filed December 26, 1916. Serial No. 138,584.

*To all whom it may concern:*

Be it known that I, HENRY P. GALE, a citizen of the United States, residing at Oneida, in the county of Oneida and State of New York, have invented certain new and useful Improvements in Shaft-Hanger Boxes, of which the following is a specification.

This invention relates to a shaft hanger box constructed principally of sheet metal and has for its primary object the provision of a strong and substantial bearing support of relatively low weight.

A further object of my invention is the provision of novel means for maintaining the proper lubrication of the shaft bearing.

Further objects and advantages of my invention will be apparent as it is better understood by reference to the following specification when read in connection with the accompanying drawing, illustrating the preferred embodiment thereof, in which—

Figure 1 is a longitudinal section through a shaft hanger box in accordance with my invention;

Fig. 2 is a section on the line 2—2 of Fig. 1;

Fig. 3 is a detail in perspective of the saddle, and

Fig. 4 is a section on the line 4—4 of Fig. 1.

Referring to the drawing, 1 and 2 indicate, respectively, the lower and upper screws of a shaft hanger which serve to support and maintain the bearing structure in proper position. My invention comprises a receptacle 3 stamped or otherwise formed from sheet metal having reinforcing plates 4 preferably of heavier sheet metal riveted or otherwise secured to its ends. A channel 5 is stamped in the bottom and sides of the receptacle 3 extending thereabout and an indentation 6 is centrally disposed in the bottom of the receptacle to receive the end of the screw 1.

A saddle 7, formed of sheet metal bent to the required shape as illustrated in Fig. 3, is disposed within the receptacle 3, the saddle being prevented from sidewise movement by the channel 5 in which it rests. An opening 8 in the bottom of the saddle 7 registers with the indentation 6 which further assists in maintaining the saddle in the desired position and in transferring the load through the receptacle 3 to the screw 1.

The sides of the saddle 7 are recessed at 9 to receive the lower semi-cylindrical shell 10 of the bearing box. The shell 10 is constructed of sheet metal and is preferably flanged at 11 to prevent distortion and is provided with a Babbitt liner 12 secured thereto by rivets or other suitable means. The liner 12 is provided with a plurality of openings 13 into which the Babbitt 14 runs during the casting operation, thus insuring permanent retention of the bearing in proper position.

The upper section of the box comprises a semi-cylindrical shell 15 constructed of sheet metal and flanged at 16 to prevent distortion. A peripheral bead 17 is pressed outwardly from the shell 16 to reinforce the same midway of its length and the bead is expanded at the top to form a seat 18 for the screw 2. Two Babbitt liners 19 are secured by rivets or other suitable means in spaced relation within the shell 15 and are provided with openings 20 into which the Babbitt 21 runs during the casting operation.

When the parts are in assembled relation, as indicated in Fig. 1, the saddle 7 is supported in proper position within the receptacle 3 which in turn transmits the weight of the shaft to the screw 1. The lower section of the box is supported by the saddle 7 and the upper section of the box is maintained in operative position by the screw 2. The shaft 22 passes through the bearing and in the form of the device illustrated the oiling ring 23 surrounds the shaft between the spaced upper bearings 21 dipping into the oil 24 within the receptacle 3. As the shaft revolves the oil is carried by the ring 23 to the upper side of the shaft at a point midway of the length of the box whence it flows in either direction between the shaft and the bearings and eventually is discharged from the opposite ends of the bearings to the receptacle 3. The path of the oil is that best adapted to insure proper lubrication of the bearings and the oil is used repeatedly until exhausted.

The construction of my improved hanger box is such that the weight thereof is reduced to a minimum, thus reducing the load on floors and beams and the expense of transportation. The box being constructed principally of sheet metal, loss from breakage is entirely obviated. Furthermore my construction is such that the cost of manufacture is reduced to a minimum while at the same time I am enabled to produce a hanger box of the required stiffness and durability to withstand the severe stresses to which devices of this character are subjected in use. The sheet metal employed in the manufacture of my invention is preferably steel.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a device of the character described, the combination of a bearing box, an oil receptacle and a saddle constructed of sheet metal having a substantially rectangular base which rests in and is held against movement relative to said receptacle, whereby said bearing box is maintained in fixed axial relation to the axis of said oil receptacle.

2. In a device of the character described, the combination of a bearing box, an oil receptacle, and a saddle resting in said receptacle comprising spaced side walls, integrally connected, said side walls being recessed to receive and freely support said box.

3. In a device of the character described, the combination of a sectional bearing box, a sheet metal oil receptacle surrounding the lower section of said box, and a saddle having a substantially rectangular base which rests in and is held against movement relative to said receptacle, whereby said bearing box is maintained in fixed axial relation to the axis of said oil receptacle.

4. In a device of the character described, the combination of a bearing box, an oil receptacle constructed of sheet metal, and having a vertically disposed indentation in the bottom thereof, and a box-supporting saddle resting in said receptacle and comprising spaced side walls and a bottom integral therewith, said bottom having an opening registering with said indentation.

5. In a device of the character described, the combination of a sectional bearing box, an oil receptacle constructed of sheet metal and inclosing the lower section of said box, and reinforcing plates secured to the ends of said receptacle.

6. In a device of the character described, the combination of a bearing box comprising two sections, each consisting of a sheet metal shell, a liner secured to the shell, and a layer of bearing metal secured to the liner, the shell of the upper section of said box being provided with a circumferentially disposed bead pressed up therefrom and extending from edge to edge thereof.

7. In a device of the character described, the combination of a bearing box comprising two sections, each consisting of a sheet metal shell, a liner secured to the shell, a layer of bearing metal secured to the liner, the shell of the upper section of said box being provided with a circumferentially disposed bead pressed up therefrom, a sheet metal oil receptacle, and a hollow saddle disposed within said receptacle and recessed to receive the lower section of said box.

8. In a device of the character described, the combination of a sectional bearing box, bearings in each section of said box, the bearing in the upper section being divided midway of its length, a shaft journaled in said bearings, an oil receptacle, means in said receptacle for supporting said box, and means for conveying oil from said receptacle to said shaft between the divided portions of the upper bearing.

9. In a device of the character described, the combination of a longitudinally divided sectional bearing box, each section comprising a sheet metal shell and a bearing supported therein, the shell of the upper section being provided with a circumferential bead struck outwardly therefrom midway of its length and the corresponding bearing being divided beneath said bead, a shaft journaled in said bearing, an oil receptacle, means in said receptacle for supporting said box, and means for conveying oil from said receptacle to said shaft between the divided portions of the upper bearing.

10. In a device of the character described, the combination of a longitudinally disposed sectional bearing box, each section comprising a sheet metal shell flanged outwardly at its ends and a bearing supported therein, the shell of the upper section being provided with a circumferential bead struck outwardly therefrom and the corresponding bearing being divided beneath said bead, a shaft journaled in said bearing, a sheet metal oil receptacle surrounding the lower section of said box, a hollow saddle in said receptacle for supporting said box, and means for conveying oil from said receptacle to said shaft between the divided portions of the upper bearing.

HENRY P. GALE.

Witnesses:
GEO. J. GRIFFIN,
R. C. DOREMUS.